D. HILLS
Machine for Gathering Grass, &c.
No. 3,777.
Patented Oct. 7, 1844.
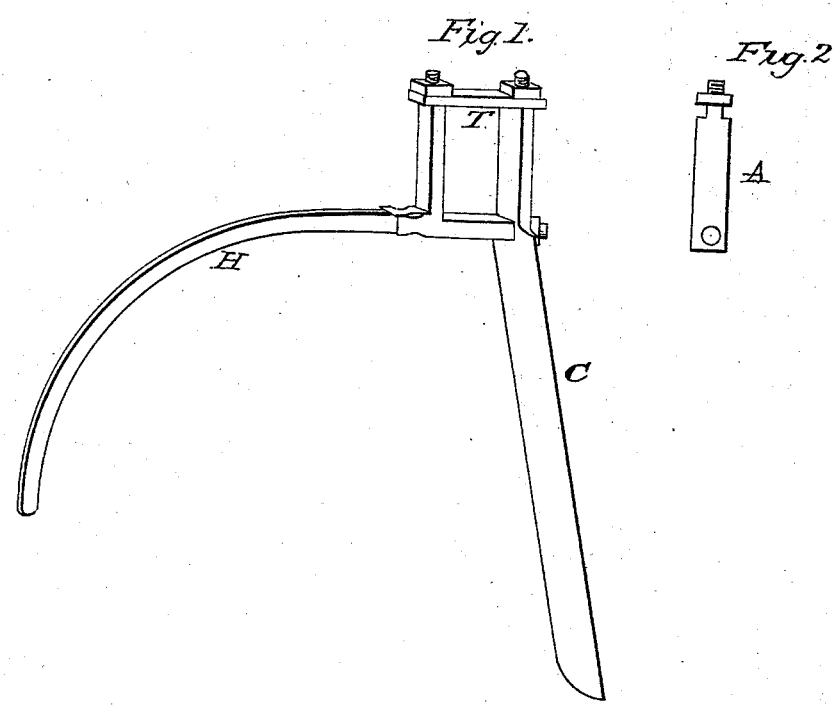

UNITED STATES PATENT OFFICE.

DUDLEY HILLS, OF EAST HARTFORD, CONNECTICUT.

IMPROVEMENT IN PLOWS.

Specification forming part of Letters Patent No. 3,777, dated October 7, 1844.

*To all whom it may concern:*

Be it known that I, DUDLEY HILLS, of East Hartford, in the county of Hartford and State of Connecticut, have invented a new and useful Improvement for Plows, which I denominate a "Gathering-Hook," for gathering in grass, grain, weeds, &c., in plowing; and I do hereby declare that the following is a clear and exact description of the construction and operation of the same, reference being had to the annexed drawings, making a part of this specification, in which—

Figure 1 is a perspective view of the hook. C is the colter, which may be used or not, as the case may be.

a A, Fig. 2, is a strip of iron to supply its place in fastening it to the beam of the plow.

H, Fig. 1, is the hook, which I find works best made elliptical, with the point of the hook that runs in the furrow turned up a little toward the end of the beam; but the figure is not of much consequence, as a slight variation will not make much difference.

T are strips of iron on the end of the hook, forming a frame or clamp to fasten it to the beam of the plow. The beam is passed through and the frame screwed up, holding it firmly in its place.

The operation is as follows: The hook must be fastened to the beam of the plow at such a distance from the share as the curvature of the mold-board will require. If the curve is slight, it will require but a short distance; if considerable, it can be put farther from the share. Having adjusted it, the point of the hook H drops into the opposite furrow. The grass, grain, weeds, &c., must pass under the hook, and in this inclining posture the dirt from the mold-board covers them up.

I do not claim as my invention the colter connected with the hook; but

What I do claim as my invention, and desire to secure by Letters Patent, is—

The gathering-hook H, as described and contemplated in this specification, applied to plows for gathering in grain, grass, weeds, &c., to turn them under the sod in plowing.

DUDLEY HILLS.

Witnesses:
S. SMITH,
ELIZA JOHNSON.